US010744857B2

(12) United States Patent
Mayer et al.

(10) Patent No.: US 10,744,857 B2
(45) Date of Patent: Aug. 18, 2020

(54) VEHICLE AIR CONDITIONING SYSTEM AND METHOD FOR OPERATING SUCH A SYSTEM

(71) Applicant: FORD GLOBAL TECHNOLOGIES, LLC, Dearborn, MI (US)

(72) Inventors: Walter Mayer, Bruehl (DE); Markus Markowitz, Cologne (DE); Dietmar Fischer, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 360 days.

(21) Appl. No.: 14/704,167

(22) Filed: May 5, 2015

(65) Prior Publication Data
US 2015/0328954 A1 Nov. 19, 2015

(30) Foreign Application Priority Data

May 16, 2014 (DE) .................. 10 2014 209 370

(51) Int. Cl.
F25D 17/06 (2006.01)
B60H 1/32 (2006.01)
B60H 1/00 (2006.01)

(52) U.S. Cl.
CPC ........ B60H 1/3233 (2013.01); B60H 1/00785 (2013.01); B60H 1/00885 (2013.01);
(Continued)

(58) Field of Classification Search
CPC .. F25D 17/065; F25D 2400/04; F25D 17/045; B60H 1/00371; B60H 2001/00235; B60H 1/323
(Continued)

(56) References Cited

U.S. PATENT DOCUMENTS

2001/0011631 A1* 8/2001 Lumbreras ............... B01D 1/16
 203/10
2002/0172633 A1* 11/2002 Koermer ................ B01D 53/06
 423/219
2011/0067422 A1* 3/2011 Ichishi ................ B60H 3/0085
 62/176.1

FOREIGN PATENT DOCUMENTS

DE 10227660 1/2004
DE 10325606 A1 1/2004
(Continued)

OTHER PUBLICATIONS

English Machine Translation of EP2301779A1.
English Machine Translation of DE10325606A1.
English Machine Translation of JP2012203232A.

Primary Examiner — Melvin Jones
(74) Attorney, Agent, or Firm — David Coppiellie; King & Schickli, PLLC

(57) ABSTRACT

The invention relates to a method for operating an air conditioning system for a vehicle including the steps of: calculating a water collection quantity in an evaporator during the operating period of a cooling mode of the air conditioning system,
calculating a quantity of drainage water from the evaporator, determining a quantity of water present in the evaporator at a certain point in time, and
comparing the determined quantity of water in the evaporator with a predetermined limit value at the point in time of starting the vehicle or at the point in time of starting the ventilation mode of the air conditioning system.
The cooling mode of the air conditioning system is activated if the limit value is exceeded and otherwise the ventilation mode of the air conditioning system is activated.

16 Claims, 2 Drawing Sheets

Figure 1:
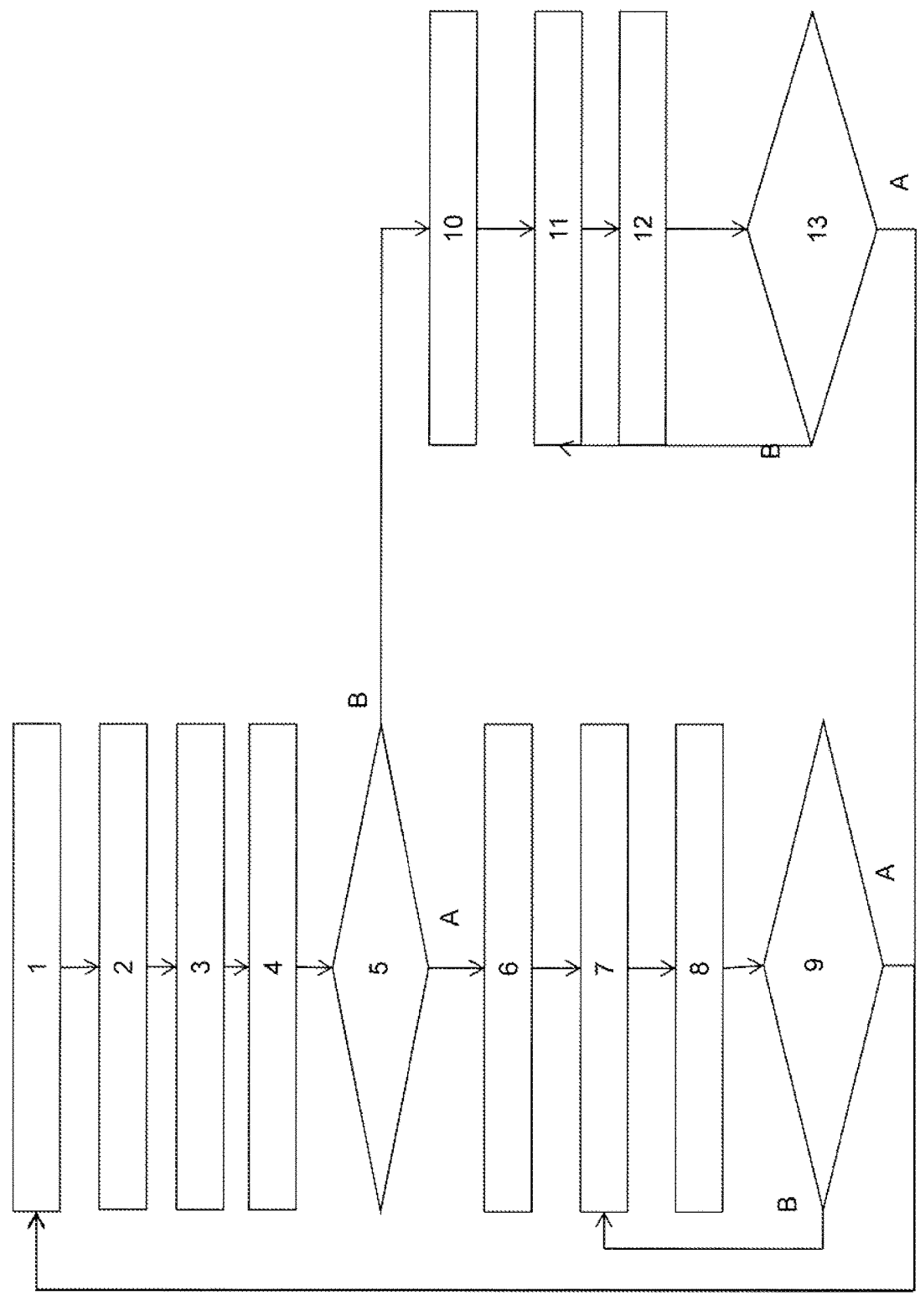

(52) U.S. Cl.
CPC ......... *B60H 1/3202* (2013.01); *B60H 1/3207* (2013.01); *B60H 2001/3241* (2013.01); *B60H 2001/3245* (2013.01)

(58) Field of Classification Search
USPC ..................................................... 62/89, 190
See application file for complete search history.

(56) References Cited

FOREIGN PATENT DOCUMENTS

| | | |
|---|---|---|
| EP | 2301779 A1 | 3/2011 |
| JP | 2012203232 A | 10/2012 |

\* cited by examiner

VEHICLE AIR CONDITIONING SYSTEM AND METHOD FOR OPERATING SUCH A SYSTEM

TECHNICAL FIELD

The present invention relates to a method for operating an air conditioning system for a vehicle, in particular a motor vehicle, as well as a vehicle air conditioning system.

BACKGROUND

During the operation of such a vehicle air conditioning system, in particular during the cooling mode, during which the evaporator is cooled, water condenses in the evaporator from the air to be fed to the interior of the vehicle and blown through the evaporator by means of the fan, in particular if the air is warm and/or moist. The condensed water collects in the evaporator, for example on the surfaces of cold pipes, plates and/or cooling fins. If the quantity of the condensed water in the evaporator has reached a certain quantity, condensed water is discharged from the evaporator to the exterior in a known manner.

However, a residual amount of condensed water remaining in the evaporator following the cooling mode of the vehicle air conditioning system cannot generally be prevented, for example as a result of surface tension. However, the result of said residual quantity of water in the evaporator can, if following the cooling mode the vehicle air conditioning system is only operated in the ventilation mode, in which the evaporator is not cooled and the air to be fed to the interior of the vehicle is blown through the warming evaporator by means of the fan, be that the condensed water collected in the evaporator is suddenly evaporated and is carried with the air flow into the interior of the vehicle, where it can condense on (cold) vehicle window panes, which is referred to here as "flash fogging". The misting of the window panes results in significantly restricted vision through the same. In order to prevent the flash-fogging effect, the evaporator must be kept cool and hence the vehicle air conditioning system must be operated in the cooling mode. However, the cooling mode of the vehicle air conditioning system requires significantly more energy in comparison to the pure ventilation mode and should only be used to prevent the misting of the window panes or to provide a pleasant climate in relation to temperature and air humidity for the vehicle occupants in the interior of the vehicle.

A generic vehicle air conditioning system is known from DE 102 27 660 B3 for example, with which the flash-fogging effect is prevented by the controlled evaporation of condensed water deposited on the evaporator during a drying phase. For this a control device of the vehicle air conditioning system is configured to control the amount of thermal energy that is fed to the evaporator during the drying phase per unit time accordingly.

Against this background, the object of the present invention is to provide a method for operating a vehicle air conditioning system as well as a vehicle air conditioning system, with which the flash-fogging effect can be reliably prevented inexpensively. Moreover, the method as well as the air conditioning system should also contribute to a saving of energy when operating the air conditioning system.

SUMMARY

This object is achieved by a method as well as by a vehicle air conditioning system with the features of the following claims. The respective dependent claims disclose further particularly advantageous embodiments of the invention.

It is to be noted that the features individually mentioned in the claims can be combined with each other in any technically meaningful way and reveal further embodiments of the invention. The description additionally characterizes and specifies the invention, in particular in combination with the FIGURES.

According to the invention, a method for operating an air conditioning system for a vehicle, in particular for a motor vehicle, includes the steps set out below. The air conditioning system comprises at least one evaporator and a fan for producing an air flow to be fed to an interior of the vehicle through the evaporator. The evaporator is cooled during a cooling mode of the air conditioning system and the air conditioning system is not cooled during a ventilation mode. The method includes the steps of:

calculating a water collection quantity in the evaporator during the operating period of the cooling mode of the air conditioning system, calculating a quantity of drainage water from the evaporator, determining a quantity of water present in the evaporator at a certain point in time from the difference of the water collection quantity and the quantity of drainage water and comparing the determined quantity of water in the evaporator with a predetermined limit value at the point in time of starting the vehicle or at the point in time of starting the ventilation mode of the air conditioning system, wherein according to the invention the cooling mode of the air conditioning system is activated if the limit value is exceeded and otherwise the ventilation mode of the air conditioning system is activated.

The method according to the invention is capable of reliably preventing the flash-fogging effect by automatically switching the air conditioning system into the cooling mode, in which the evaporator is cooled, at the point in time of starting the vehicle or at the point in time of starting the ventilation mode of the air conditioning system only on exceeding the limit value, which represents a critical quantity of water in the evaporator, for example about 10 to 100 ml. As a result, a sudden evaporation of the quantity of water present in the evaporator is prevented. Because the method is essentially based on calculations that can be carried out by a control device associated with the air conditioning system, no special structural changes to the air conditioning system have to be carried out, so that the method according to the invention constitutes a particularly inexpensive solution to preventing the flash-fogging effects. Moreover, the method according to the invention also enables the saving of energy when operating the air conditioning system, because the system is only automatically operated in the cooling mode at the point in time of starting the vehicle or at the point in time of starting the ventilation mode of the air conditioning system if there is actually a risk of the flash-fogging effects, i.e. if there is a critical quantity of water in the evaporator that could suddenly be evaporated with the evaporator warming up in the ventilation mode of the air conditioning system, whereby the humidity of the air blown into the interior of the vehicle would suddenly increase.

According to an advantageous embodiment of the invention, the water collection quantity per unit time in the evaporator is calculated from the difference of the moisture content of the air blown out at the air flow outlet of the evaporator by the fan and the moisture content of the air sucked in at the air flow inlet of the evaporator by the fan while taking into account the air flow speed through the evaporator produced by the fan. For this purpose the air conditioning system can comprise suitable moisture sensors for determining the moisture content at the evaporator input and evaporator output. The air flow speed produced by the fan is known from the fan setting of the air conditioning system, which can either be specified by a user or automatically selected for example by a control device of the air conditioning system.

The moisture content of the air at the air flow inlet of the evaporator is preferably determined depending on the ambient temperature and the ambient humidity. The temperature outside of the installation location of the air conditioning system, i.e. for example outside of the vehicle, is to be understood to be the ambient temperature here. In a corresponding manner the ambient humidity gives the moisture content of the air outside of the vehicle or at the evaporator input. Advantageously, the ambient temperature is measured by a temperature sensor that is already present in the vehicle, whose measurement result is thus available to the method according to the invention.

Furthermore, the moisture content of the air at the air flow outlet of the evaporator is preferably determined depending on the temperature of the evaporator and assuming a relative air humidity of 100% at the air flow outlet of the evaporator. The temperature of the evaporator can be detected by means of a suitable temperature sensor on or in the evaporator.

A further advantageous embodiment of the invention provides that water is discharged from the evaporator during the cooling mode of the air conditioning system once a predetermined quantity of water, preferably between about 100 ml and 200 ml, has collected in the evaporator.

According to a further advantageous embodiment of the invention, during the ventilation mode of the air conditioning system, during which water present in the evaporator can evaporate, the quantity of drainage water from the evaporator per unit time can be determined using the air flow speed through the evaporator produced by the fan and the ambient temperature.

A further advantageous embodiment of the invention provides that during a switch-off period of the air conditioning system, for example if the vehicle is parked or the air conditioning system is manually switched off by a user, the quantity of drainage water from the evaporator per unit time is determined using the ambient temperature. Preferably, in the case in which the vehicle is parked, the ambient temperature at the point in time of stopping the vehicle is determined and the water drainage quantity or the evaporation quantity of the water in the evaporator is determined using said determined ambient temperature and the stopped period of the vehicle or the switch-off period of the air conditioning system is estimated.

Advantageously, air is blown into or circulated through the evaporator by means of a fan provided for the ventilation mode during a standstill period of the vehicle without occupants in the vehicle. As a result, the evaporator can be dried by means of the fan. The switch-off time of the fan is preferably determined after the point in time at which the water content in the evaporator reaches the value zero. The air for blowing into the evaporator can come both from the interior of the vehicle and also from the surroundings (ambient air), depending on which air is more suitable for drying. This can be controlled by means of the air circulation and mixing functions present in vehicle air conditioning systems for the interior ventilation.

According to a further aspect of the present invention, an air conditioning system is provided for a vehicle, in particular for a motor vehicle, comprising at least one evaporator and a fan for producing an air flow for feeding to an interior of the vehicle through the evaporator, wherein the evaporator is cooled during a cooling mode of the air conditioning system and is not cooled during a ventilation mode of the air conditioning system. Furthermore, the air conditioning system according to the invention comprises a control device that is configured to carry out a method as claimed in any one of the previously described embodiments.

BRIEF DESCRIPTION OF THE DRAWING FIGURES

Further features and advantages of the invention are revealed in the following description of an exemplary embodiment of the invention that is not to be understood to be limiting, which is explained in detail below with reference to the FIGURES.

FIG. 1 shows a flow chart of an exemplary embodiment of the method according to the invention.

Figure 2:
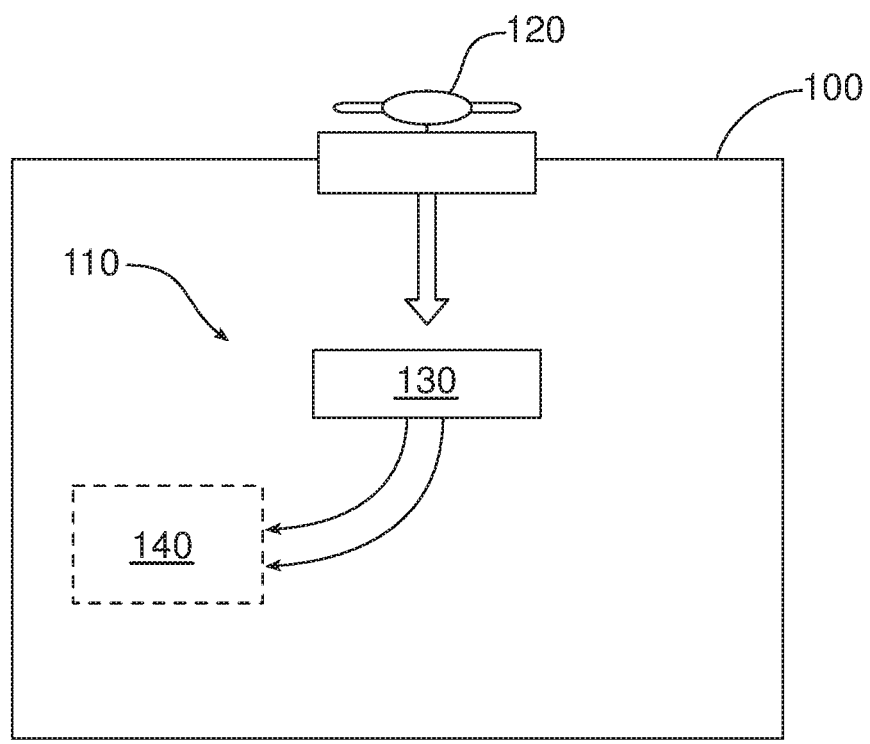

FIG. 2 hows an exemplary embodiment of an air conditioning system for a motor vehicle, including an evaporator and a fan according the invention.

DETAILED DESCRIPTION

In step 1 shown in FIG. 1, a vehicle 100 is started in which the air conditioning system 110 according to the invention shown in FIG. 2 is installed, which comprises essentially at least one evaporator 130 and a fan 120 for producing an air flow to be fed to an interior 140 of the vehicle through the evaporator, and in which it is controlled by a control device, such as a dedicated microprocessor or electronic control unit (ECU) configured to carry out the method according to the invention.

In step 2 the quantity of drainage water from the evaporator during the switch-off period of the air conditioning system is estimated by recording and storing the ambient temperature and possibly the air humidity of the surroundings and/or in the interior of the vehicle at the point in time of switch-off.

Then the current quantity of water present in the evaporator is calculated in step 3 from the difference of the water collection quantity and the quantity of drainage water and the updated value is stored for further processing, for example in the subsequent step 4.

In the subsequent step 4 the ambient temperature, the ambient humidity and the evaporator temperature are measured by means of suitable sensors, as already described in the general part of this description. Furthermore, in step 4 the current air flow speed through the evaporator is determined using the fan setting of the air conditioning system and, as will be explained in the subsequent steps, the quantity of water present in the evaporator, which is calculated and stored in the subsequent steps, is determined.

In the subsequent step 5 a check is made as to whether the calculated quantity of water is greater than a predetermined limit value, for example about 10 to 100 ml. If in step 5 the calculated quantity of water in the evaporator is greater than the limit value, the method continues with step 6 (branch A).

In step 6 the cooling mode of the air conditioning system, in which the evaporator is cooled in a conventional manner, is started.

Then in step 7 the water collection quantity in the evaporator is calculated depending on the ambient temperature, the ambient humidity, the evaporator temperature and the air flow speed through the evaporator according to the fan setting. For example, the water collection quantity per unit time can be stored in the form of a lookup table in a control device associated with the air conditioning system. Such a table is given below with typical values by way of example:

| Ambient temperature [° C.] | Ambient humidity [%] | Air flow [l/s] | Evaporator temperature [° C.] | Water collection rate [ml/min] |
|---|---|---|---|---|
| 5 | 90 | 60 | 4 | 0 |
| 7 | 90 | 60 | 4 | 2.36 |
| 10 | 90 | 50 | 4 | 6.51 |
| 15 | 70 | 50 | 4 | 8.48 |
| 18 | 60 | 50 | 4 | 9.47 |

In the subsequent step 8, the current quantity of water present in the evaporator is calculated from the difference of the water collection quantity and the quantity of drainage water, whose determination is described further below, and the updated value is stored for further processing, for example in step 4.

In step 9 a check is made as to whether the vehicle has been turned off and thus the air conditioning system has also been turned off. If this is not the case (branch B), the method returns to step 7 and carries out steps 7, 8 and 9 repeatedly. If the determination in step 9 gives the result that the vehicle was turned off and hence also the air conditioning system was turned off, the method according to the invention then returns to step 1.

If the determination in step 5 gives the result that the quantity of water present in the evaporator is smaller than the predetermined limit value (branch B), the method continues with step 10.

In step 10 the cooling mode of the air conditioning system is not started as in step 6, but only the ventilation mode of the air conditioning system, in which the evaporator is not cooled.

Then in step 11 the quantity of drainage water is determined based on the air flow passed through the evaporator. For this purpose, during the ventilation mode the quantity of drainage water from the evaporator per unit time is determined using the air flow speed through the evaporator produced by the fan and the ambient temperature.

In the next step 12 the current quantity of water present in the evaporator is calculated from the difference of the water collection quantity and the quantity of drainage water and the updated value is stored for further processing, for example in step 4.

In step 13 a check is made as to whether the vehicle was turned off and hence also the air conditioning system was turned off. If this is not the case (branch B), the method returns to step 11 and carries out steps 11, 12 and 13 repeatedly. If the determination in step 13 gives the result that the vehicle was turned off and hence the air conditioning system was also turned off, the method according to the invention then returns to step 1.

The method according to the invention for operating a vehicle air conditioning system as well as the vehicle air conditioning system have been explained using an exemplary embodiment shown in the FIGURE. The method as well as the air conditioning system are however not restricted to the embodiment described herein, but also include embodiments with the same effect.

In a preferred embodiment, the method according to the invention is used for the control of the operation of an air conditioning system in a vehicle, in particular a motor vehicle. Furthermore, the air conditioning system according to the invention is preferably used in a vehicle, in particular in a motor vehicle, for the climate control of an interior of a vehicle having at least one glass pane or window pane.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method for operating an air conditioning system for a vehicle with at least one evaporator and a fan for producing an air flow through the at least one evaporator to be fed to an interior of the vehicle, wherein the at least one evaporator is cooled during a cooling mode of the air conditioning system and is not cooled during a ventilation mode of the air conditioning system, said method comprising:

calculating a water collection quantity in the at least one evaporator during an operating period of the cooling mode, calculating a quantity of drainage water from the at least one evaporator, determining a quantity of water present in the at least one evaporator at a certain point in time from the difference of the water collection quantity and the quantity of drainage water; and comparing, at the point in time of starting the vehicle or at the point in time of starting the ventilation mode the determined quantity of water in the at least one evaporator with a predetermined limit value, wherein the cooling mode is activated if the predetermined limit value is exceeded and otherwise the ventilation mode is activated.

2. The method as claimed in claim 1, further including calculating the water collection quantity in the at least one evaporator per unit time from the difference of a moisture content of the air blown out by the fan at the air flow outlet of the at least one evaporator and the moisture content of the air at the air flow inlet of the at least one evaporator sucked in by the fan while taking into account the air flow speed through the at least one evaporator produced by the fan.

3. The method as claimed in claim 1, further including determining the moisture content of the air at the air flow inlet of the at least one evaporator depending on ambient temperature and ambient humidity outside of the vehicle.

4. The method of claim 3 further including determining the moisture content of the air at the air flow outlet of the at least one evaporator depending on the temperature of the at least one evaporator and assuming a relative air humidity of 100% at the air flow outlet of the at least one evaporator.

5. The method of claim 4, further including discharging water from the at least one evaporator during the cooling mode once a predetermined quantity of water has collected in the at least one evaporator.

6. The method of claim 5, further including determining, during the ventilation mode, the quantity of water from the at least one evaporator per unit time using an air flow speed through the at least one evaporator produced by the fan and the ambient temperature.

7. The method of claim 6, further including determining, during a switch-off period of the air conditioning system, the quantity of drainage water from the at least one evaporator per unit time using the ambient temperature.

8. The method of claim 6, further including determining, during a switch-off period of the air conditioning system, the quantity of drainage water from the at least one evaporator per unit time using the ambient air humidity.

9. The method of claim 6, further including blowing air into the at least one evaporator by means of a fan provided for the ventilation mode during a standstill period of the vehicle without occupants in the vehicle.

10. The method of claim 1, further including discharging water from the at least one evaporator during the cooling mode once a predetermined quantity of water has collected in the evaporator.

11. The method of claim 1, further including determining, during the ventilation mode, the quantity of water from the at least one evaporator per unit time using the air flow speed through the at least one evaporator produced by the fan and the ambient temperature.

12. The method of claim 1, further including determining, during a switch-off period of the air conditioning system, the quantity of drainage water from the at least one evaporator per unit time using the ambient temperature.

13. The method of claim 1, further including determining, during a switch-off period of the air conditioning system, the quantity of drainage water from the at least one evaporator per unit time using the ambient air humidity.

14. The method of claim 1, further including blowing air into the at least one evaporator by means of a fan provided for the ventilation mode during a standstill period of the vehicle without occupants in the vehicle.

15. A method of operating an air conditioning system for a vehicle with at least one evaporator and one fan, comprising:
 drying said evaporator by circulating ambient air through said at least one evaporator with said fan when said vehicle is standing still and unoccupied; and
 terminating drying by stopping circulation of the air through said at least one evaporator when water content in said evaporator reaches a zero value.

16. A method of operating an air conditioning system for a vehicle with at least one evaporator and one fan, comprising:
 drying said at least one evaporator by circulating interior vehicle air through said evaporator with said fan when said vehicle is standing still and unoccupied; and
 terminating drying by stopping circulation of the interior air through said at least one evaporator when water content in said at least one evaporator reaches a zero value.

\* \* \* \* \*

UNITED STATES PATENT AND TRADEMARK OFFICE
CERTIFICATE OF CORRECTION

PATENT NO. : 10,744,857 B2
APPLICATION NO. : 14/704167
DATED : August 18, 2020
INVENTOR(S) : Walter Mayer et al.

It is certified that error appears in the above-identified patent and that said Letters Patent is hereby corrected as shown below:

In the Claims

Column 8, Line 8, please replace "drying said evaporator" with --- drying said at least one evaporator ---, and Column 8, Line 11, please replace "circulation of the air" with --- circulation of the ambient air ---, and Column 8, Line 13, please replace "in said evaporator" with --- in said at least one evaporator ---, and Column 8, Line 18, please replace "through said evaporator" with --- through said at least one evaporator ---, and Column 8, Line 20-21, please replace "of the interior air" with --- of the interior vehicle air ---.

Signed and Sealed this
Sixth Day of October, 2020

Andrei Iancu
*Director of the United States Patent and Trademark Office*